US009967779B2

(12) United States Patent
Norlin et al.

(10) Patent No.: US 9,967,779 B2
(45) Date of Patent: May 8, 2018

(54) METHODS AND NETWORK NODE FOR OBTAINING A REQUIRED LATENCY FOR TRANSMISSIONS (71) Applicant: Telefonaktiebolaget LM Ericsson (publ), Stockholm (SE)

(72) Inventors: Cristian Norlin, Stockholm (SE); Marcus Gårdman, Skärholmen (SE); Joakim Formo, Åkersberga (SE); Anna Viggedal, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 15/129,347

(22) PCT Filed: Mar. 27, 2014

(86) PCT No.: PCT/SE2014/050370
§ 371 (c)(1),
(2) Date: Sep. 26, 2016

(87) PCT Pub. No.: WO2015/147713
PCT Pub. Date: Oct. 1, 2015

(65) Prior Publication Data
US 2017/0111827 A1 Apr. 20, 2017

(51) Int. Cl.
H04W 28/24 (2009.01)
H04L 12/26 (2006.01)
(Continued)

(52) U.S. Cl.
CPC ......... H04W 28/24 (2013.01); H04L 41/0803 (2013.01); H04L 43/0852 (2013.01); H04W 24/08 (2013.01); H04W 4/046 (2013.01)

(58) Field of Classification Search
CPC ..... H04W 28/24; H04W 24/08; H04W 4/046; H04L 43/0852; H04L 41/0803
See application file for complete search history.

(56) References Cited

U.S. PATENT DOCUMENTS

2005/0271071 A1    12/2005   Madhavapeddi et al.
2009/0052319 A1*   2/2009    Muqattash ............ H04L 45/302
                                                     370/230.1
(Continued)

FOREIGN PATENT DOCUMENTS

WO    WO 2011/149786 A2    12/2011

OTHER PUBLICATIONS

International Search Report, Application No. PCT/SE2014/050370, dated Jan. 15, 2015.
(Continued)

Primary Examiner — Omar J Ghowrwal
(74) Attorney, Agent, or Firm — Sage Patent Group (57) ABSTRACT A method and a network node for obtaining a required latency for transmissions between a wireless device and a controller node are disclosed. The network node receives at least one parameter relating to a context of at least one of the wireless device and the controller node. The parameter is detectable by a set of sensor modules. The network node determines, based on the parameter, the required latency for the transmissions. The context comprises one or more of: a surrounding of the at least one of the wireless device and the controller node; an operational ability of the at least one of the wireless device and the controller node; and a sensitivity of operation of the at least one of the wireless device and the controller node. The surrounding, operational ability and/or the sensitivity is/are detectable by at least one sensor module of the set of sensor modules.

9 Claims, 4 Drawing Sheets (51) Int. Cl.
*H04L 12/24* (2006.01)
*H04W 24/08* (2009.01)
*H04W 4/04* (2009.01)

(56) References Cited

U.S. PATENT DOCUMENTS

2010/0070079 A1 3/2010 Mangaser et al.
2012/0265898 A1 10/2012 Kruglick

OTHER PUBLICATIONS

Written Opinion of the International Searching Authority, Application No. PCT/SE2014/050370, dated Jan. 15, 2015.

* cited by examiner

METHODS AND NETWORK NODE FOR OBTAINING A REQUIRED LATENCY FOR TRANSMISSIONS

CROSS REFERENCE TO RELATED APPLICATION

This application is a 35 U.S.C. § 371 national stage application of PCT International Application No. PCT/SE2014/050370, filed on Mar. 27, 2014, the disclosure and content of which is incorporated by reference herein in its entirety. The above-referenced PCT International Application was published in the English language as International Publication No. WO 2015/147713 A1 on Oct. 1, 2015.

TECHNICAL FIELD

Embodiments herein relate to communication systems, including so called cloud based network functions. In particular, a method and a network node for obtaining a required latency for transmissions between a wireless device and a controller node are disclosed. Corresponding computer programs and carriers therefor are also disclosed.

BACKGROUND

Use of communication systems is wide spread since more and more devices are capable of being connected, foremost by wireless, but also by wired, technologies. One use of the communication systems concerns control systems in various applications.

A known control system may include a device controlled by a server. The device can be an object or a process. Within the control system, transmissions are transferred to and from the device and/or the server in order to provide control information for controlling of the device and feedback information to be used by the server when controlling the device. In this context, latency can be defined as a time interval, starting when a transmission is sent from the server and ending when a response to the transmission is received by the server.

For the device, a required latency is a measure of what network performance in terms of latency is required in order for the device to be properly, and safely, controlled.

For the known control system, an actual latency, which is a measure of a current or actual network performance in terms of latency, can vary depending on fluctuations among a plurality of factors. Examples of such factors are number of connected devices, data rates for connected devices, type of connection, i.e. wired or wireless and even weather conditions. This implies that when the factors indicate harsh conditions, e.g. bad weather and high network load, the actual latency becomes higher.

In a real-life example, the device is a truck and the server is a computer that is used by a remote driver for remotely controlling the truck. In view of the above explained unintentional variations in actual latency depending on the plurality of factors, a problem may be that the harsh conditions, such as bad weather, causes the actual latency to increase which makes it more difficult for the remote driver to properly, and safely, control the truck.

SUMMARY

An object may be to enable improved performance, e.g. in terms of efficient, safe and/or proper operation, of the communication system mentioned above.

According to an aspect, the object is achieved by a method, performed by a network node, for obtaining a required latency for transmissions between a wireless device and a controller node. The controller node is configured to control the wireless device. The network node receives at least one parameter relating to a context of at least one of the wireless device and the controller node. The at least one parameter relating to the context is detectable by a set of sensor modules. The network node determines, based on the at least one parameter, the required latency for the transmissions. The context comprises one or more of: a surrounding of the at least one of the wireless device and the controller node; an operational ability of the at least one of the wireless device and the controller node; and a sensitivity of operation of the at least one of the wireless device and the controller node.

The surrounding is measured in terms of a physical quantity detectable by at least one sensor module of the set of sensor modules.

The operational ability relates to malfunction of one or more of the set of sensor modules.

The sensitivity of operation indicates a scenario, detectable by at least one sensor module of the set of sensor modules. The required latency ensures proper operation of the at least one of the wireless device and the controller node with respect to the scenario.

According to another aspect, the object is achieved by a network node configured to obtain a required latency for transmissions between a wireless device and a controller node. The controller node is configured to control the wireless device. The network node is configured to receive at least one parameter relating to a context of at least one of the wireless device and the controller node. The at least one parameter relating to the context is detectable by a set of sensor modules. Moreover, the network node is configured to determine, based on the at least one parameter, the required latency for the transmissions. The context comprises one or more of: a surrounding of the at least one of the wireless device and the controller node; an operational ability of the at least one of the wireless device and the controller node; and a sensitivity of operation of the at least one of the wireless device and the controller node.

The surrounding is measured in terms of a physical quantity detectable by at least one sensor module of the set of sensor modules.

The operational ability relates to malfunction of one or more of the set of sensor modules.

The sensitivity of operation indicates a scenario, detectable by at least one sensor module of the set of sensor modules. The required latency ensures proper operation of the at least one of the wireless device and the controller node with respect to the scenario.

According to further aspects, the object is achieved by a computer program and a carrier for the computer program corresponding to the aspects above.

Thanks to that the network node determines, based on the at least one parameter, the required latency for the transmissions, the required latency is adapted to the context of the at least one of the wireless device and the controller node. In other words, the determined required latency is dependent on the context which is detectable by the set of sensor modules.

Concerning the real-life example mentioned above, the embodiments herein allow the required latency to be adjusted according to the context. Thus, e.g. when the weather is bad, implying low visibility, rain causing longer distance for breaking and the like, the required latency may be decreased to enable the remote driver to safely remotely operate the truck. In this manner, negative effects of variations in the actual latency may be reduced.

In a contrasting context, e.g. with high visibility, no or little rain, the required latency for the transmissions to the truck may be increased. In this manner, network resources, such as time slots, frequencies and the like, may be released to potentially, but not necessarily, be used by other devices.

Consequently, network performance may be improved in view of various aspects.

An advantage with embodiments herein is that the required latency is dynamically determined, or adjusted, depending on external factors in the context of the wireless device and/or the controller node, such as a connected object or process, or a person or unit controlling the object or process.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar elements, units, modules, circuits, nodes, parts, items or features, when applicable. In the Figures, features that appear in some embodiments are indicated by dashed lines.

Figure 1:
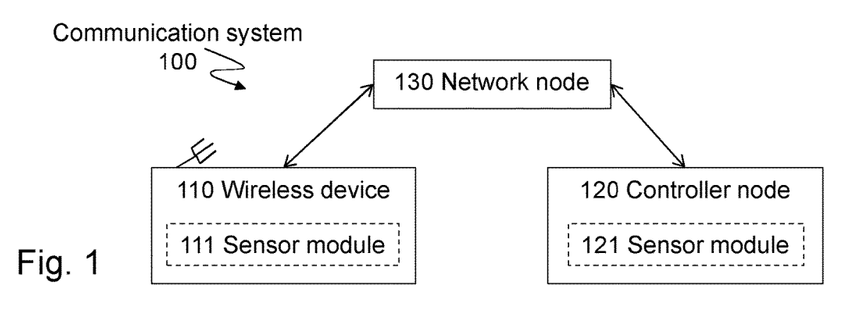
FIG. 1 is a schematic overview of an exemplifying radio communication system in which embodiments herein may be implemented.

FIG. 1 depicts an exemplifying communication system 100 in which embodiments herein may be implemented. The communication system 100 may be implemented by wired and/or wireless network technologies.

In this example, the communication system 100 may comprise a wireless network, such as a Long Term Evolution (LTE) network or an evolution thereof. In other examples, the wireless network may be a radio network, such as any cellular or wireless communication system, such as a 5G network, a Wideband Code Division Multiple Access (WCDMA) network, High Speed Packet Access (HSPA) network, Wireless Fidelity (WI-FI) network, Global System for Mobile Communications (GSM) EDGE Radio Access Network (GERAN), where EDGE is short for Enhanced Data rates for GSM Evolution, or the like.

Furthermore, a wireless device 110 and a controller node 120 are shown in FIG. 1.

As used herein, the term "wireless device" may refer to a user equipment, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of environment sensor, such as wind, temperature, air pressure, humidity, level of air pollution, etc. As further examples, the sensor may be a light sensor, an electronic or electric switch, a microphone, a loudspeaker, a camera sensor etc. The term "user" may indirectly refer to the wireless device.

The controller node 120 is configured to control the wireless device 110. A manner in which the controller node 120 is able to control the wireless device 110 may be exemplified by a first scenario and a second scenario, which will be referred to in the description below.

The first scenario relates to when the wireless device 110 is exemplified by a vehicle, such as a truck, a lorry, a car, a train, a bus, an airplane and the like. The controller node 120 may then be a monitoring terminal which may be used by an operator, such as a remote driver, to remotely control, e.g. drive or operate, the vehicle.

The second scenario relates to when the wireless device 110 is exemplified by a manufacturing machine. Here, the controller node 120 may be a computer that has been set up to monitor, control and/or supervise e.g. a chemical process for manufacturing of some product, such as a groceries, medicines, fluid as well as solid chemical compounds, or a production process for manufacturing of furniture, electrical equipment, clothes etc.

The wireless device 110 may be associated with one or more sensor modules 111, only one is shown for simplicity. In some examples, the wireless device 110 may comprise the one or more sensor modules 111. Additionally or alternatively, the wireless device 110 may be connected, by wire and/or wirelessly, to the one or more sensor modules 111. Hence, the one or more sensor modules 111 may be external, or internal, to the wireless device 110.

The controller node 120 may be associated with one or more sensor modules 121, only one is shown for simplicity. In some examples, the controller node 120 may comprise the one or more sensor modules 121. Additionally or alternatively, the controller node 120 may be connected, by wire and/or wirelessly, to the one or more sensor modules 121. Hence, the one or more sensor modules 121 may be external, or internal, to the controller node 120.

The one or more sensor modules 111, 121 may be referred to as a set of sensor modules.

The wireless device 110 and the controller node 120 may be capable of communicating 130 with each other via a network node 130, which also may be comprised in the communication system 100. The network node 130 may be a so called cloud component.

According to some embodiments herein, when operated in the communication system 100 above, there is provided a method for determining, e.g. by dynamic adjustments, of the required latency for connected wireless devices, applications, or processes in wireless communication systems, such as a fifth generation (5G) network. The network node 130 determines the required latency for transmissions, such as signals, packets, network traffic and the like, to/from the wireless device 110 that is being controlled. The network node 130 is also aware of an actual latency, or a current latency, as mentioned in the background section. The actual latency is sometimes static, but for many applications, devices and processes, it can vary over time depending on network load, or even a range of factors relating to in the context. The required latency is based on input from a range of available sensors and data from the context of the wireless device 110 and/or the controller node 120. The network node 130 adjusts the required latency accordingly. If the actual latency can be affected, e.g. by prioritization of some particular traffic such as to meet the required latency, the network node 130 may perform such prioritization, otherwise a mode of operation, or behavior, of the wireless device 110 and/or the controller node 120 is adapted such as to continue to operate safely given the actual latency, which may be less than the initially required latency. This means that for the chosen mode of operation the required latency is greater than or equal to the actual latency.

By dynamically adjusting the required latency, capacity of the communication system 100 may be more efficiently utilized. This may mean that for a particular wireless device, or applications, process or the like, which currently has a very low required latency, can be prioritized over some other wireless device, application, process or the like. Such other wireless device may be down prioritized if it currently allows a high required latency thanks to favorable context, or conditions.

Before proceeding with the detailed description, it shall be noted that the term "context" shall be understood as comprising one or more of:
  a surrounding of the at least one of the wireless device 110 and the controller node 120;
  an operational ability of the at least one of the wireless device 110 and the controller node 120; and
  a sensitivity of operation of the at least one of the wireless device 110 and the controller node 120.

At least one parameter relating to the context may be detectable by the set of sensor modules 111, 121. Therefore, the context does not relate to network conditions, such as network load, available bandwidth etc. The set of sensor modules 111, 121 may be embodied by a hardware or software module, which will be referred to in the subsequent paragraphs.

The surrounding is measured in terms of a physical quantity detectable by the at least one sensor module 111, 121 of the set of sensor modules 111, 121. This may mean that the surrounding can be exemplified by an environment for which temperature, visibility, wind speed etc., may be detected by an appropriate sensor module, typically a hardware module like a thermometer or the like. Hence, the physical quantity relates to context in the vicinity of the wireless device 110 and/or the controller node 120.

The operational ability relates to malfunction of one or more of the set of sensor modules 111, 121. As an example, a further sensor module embodied in the form of a software module may keep track of how many of the sensor modules of the set of sensor modules 111, 121 that are working, or to which extent they are working.

The sensitivity of operation indicates a scenario, detectable by at least one sensor module 111, 121 of the set of sensor modules 111, 121. The required latency ensures proper operation of the at least one of the wireless device 110 and the controller node 120 with respect to the scenario. The scenario may be a task, a process, a stage of a process, a situation or similar in which the wireless device 110 and/or controller node 120 presently operates. With reference to the first scenario, the truck, as an example of the wireless device 110, may be located in a crossing. This would imply a lower required latency as compared to when the truck is driving on e.g. an almost deserted highway, which thus would imply a higher required latency.

Figure 2:
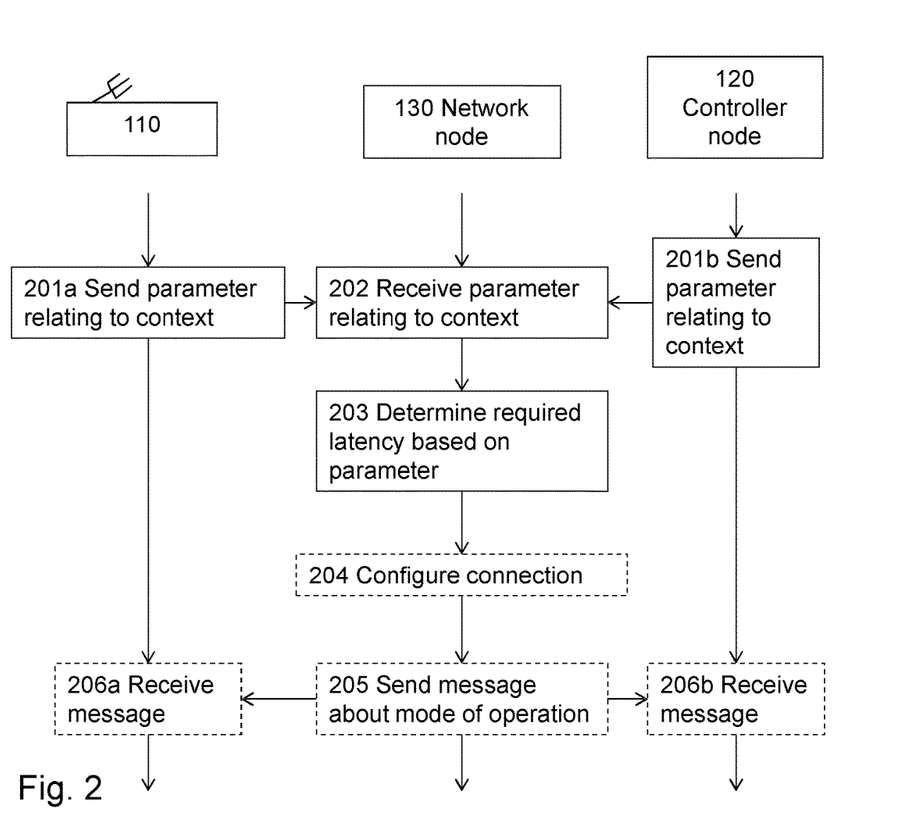
FIG. 2 is a schematic, combined signaling scheme and flowchart illustrating embodiments of the methods when performed in the radio communication system according to FIG. 1.

FIG. 2 illustrates an exemplifying method according to embodiments herein when performed in connection with the wireless communication system 100 of FIG. 1. The network node 130 performs a method for obtaining a required latency for transmissions between the wireless device 110 and the controller node 120.

The following actions may be performed in any suitable order.

Action 201a

In order to make the network node 130 aware of the context of the wireless device 110, the wireless device 110 sends at least one parameter relating to the context of the wireless device 110.

Action 201b

Similarly to action 201a, in order to make the network node 130 aware of the context of the controller node 120, the controller node 120 sends at least one parameter relating to the context of the controller node 120.

Action 202

When at least one of actions 201a and 201b has been performed, the network node 130 receives the at least one parameter relating to the context of at least one of the wireless device 110 and the controller node 120. This may mean that the at least one parameter may be received from the at least of one the wireless device 110 and the controller node 120 as exemplified by action 201a and 201b above.

Action 203

Subsequent to action 202, the network node 130 determines, based on the at least one parameter, the required latency for the transmissions.

As explained above, the at least one parameter relates to the context of the at least one of the wireless device 110 and the controller node 120.

Thanks to that the network node 130 determines the required latency based on the at least one parameter, the required latency is adapted to the context, e.g. while keeping the first scenario relating to vehicles in mind, a factual condition, such as visibility, is taken into account when determining the required latency.

In more detail with reference to the first scenario, if the at least one parameter indicates light vehicle traffic and few, if any, other road-users, i.e. vehicles, pedestrians and the like, in the proximity, the weather and road conditions are good for driving, a cargo carried by the vehicle is not very heavy, and/or a rail/road that is not slippery, it may be concluded that an extremely low required latency is less essential compared to in a traffic jam on a slippery road/rail driving a vehicle carrying a heavy cargo in an urban area.

In this action, the required latency is consequently determined, or adjusted, to the at least one parameter in order for the network node 130 to more accurately set the required latency in view of the context of the wireless device 110 and/or the controller node 120.

As an example, if the context allows for a somewhat higher required latency, then network resources, such as time slots, frequencies, buffers etc., can be saved and thus contribute to improved performance of the wireless network.

As another examples, in contrast to the example directly above, a certain context relating to the connected wireless device 110 and/or the controller node 120 may enforce a lower required latency. This may happen during for example harsh weather conditions and poor visibility if traffic is intense in case e.g. a vehicle is remotely controlled. That kind of scenario requires allowance for shorter reaction and response times from the driver. Hence the required latency must be lower compared to under perfect road conditions and low traffic. I.e. there are advantages of being able to dynamically adjust the required latency according to external aspects in the vicinity of a connected object, such as the wireless device 110 and/or the controller node 120.

Action 204

The network node 130 may configure, according to the required latency, a connection for transferring the transmissions between the wireless device 110 and the controller node 120.

This may mean that the network node 130 sends a message to the wireless network. The message may include an instruction to the wireless network to ensure that the required latency is met. Thus, the actual latency shall be less than or equal to the required latency. As an example relating to a 3GPP telecommunication system, such as LTE, the message may instruct the wireless network to apply certain Quality of Service (QoS) parameters relating to latency.

In this manner, the actual latency may be matched to the required latency. This matching may also take into account various parameters, such as a maximal tolerated latency limit defined in a Service Level Agreement (SLA) which applies to the transmissions between the wireless device 110 and the controller node 120.

The actual latency may be adjusted by means of prioritization of the specific communication between the wireless device 110 and the controller node 120.

Moreover, shifting access technology, e.g. 3G/4G/WI-FI/BLUETOOTH etc, depending on the current load and state of each type of access technology may also allow for an adjustment of the actual latency.

Furthermore, the wireless network may change, in response to the message from the network node 130, how the traffic is routed, the structure of the communication, i.e. peer-to-peer/device-to-device/multi-hop/etc. depending on what is the most efficient way for the moment in the particular context. Thus, the actual latency may be adjusted. This could for example mean that there are two oncoming vehicles that are about to exchange data. The wireless network instantly determines how to send the data with the lowest actual latency. It may turn out that a sufficiently good route is peer-to-peer communication, but via a further vehicle (multi-hop) to extend the wireless.

Action 205

Typically, action 205 is performed when it is not desired, or not even possible, to perform action 204 and/or when action 204 fails, or at least partly fails, in fulfilling the required level. Thus, the network node 130 may send, to the wireless device 110, a message about a mode of operation adapted to the required latency. The message instructs the wireless device 110 to operate according to the mode of operation.

In view of the first scenario, the vehicle may be instructed to adapt its mode of operation by decreasing its velocity. This may be beneficial when the vehicle is driven, by the remote driver, on e.g. a highway with poor visibility.

With reference to the first scenario, the remotely controlled vehicle may be enforced, by the cloud component, to decrease its speed when it enters a zone where the required latency for any reason is lower. A purpose is to not intrude on safety or security.

Again, it may be preferred to perform only one of actions 204 and 205, but it shall be understood that according to some embodiments, both action 204 and 205 is performed. In such case, it may be that it is only possible to almost configure the connection according to the required latency. Thus, to compensate for not fulfilling the required latency completely, the network node 130 may need to also perform action 205 in order to affect the mode of operation, or behavior, of the wireless device 110 and/or the controller node 120.

Action 206a

When the network node 130 has sent the message in action 205 to the wireless device 110, the wireless device 110 may receive the message.

Then, the wireless device 110 may, in this action or as a separate action, begin to operate, or behave, according to the mode of operation as specified by the message.

Action 206b

When the network node 130 has sent the message in action 205 to the controller node 120, the controller node 120 may receive the message.

Then, the controller node 120 may, in this action or as a separate action, begin to operate, or behave, according to the mode of operation as specified by the message.

Figure 3:
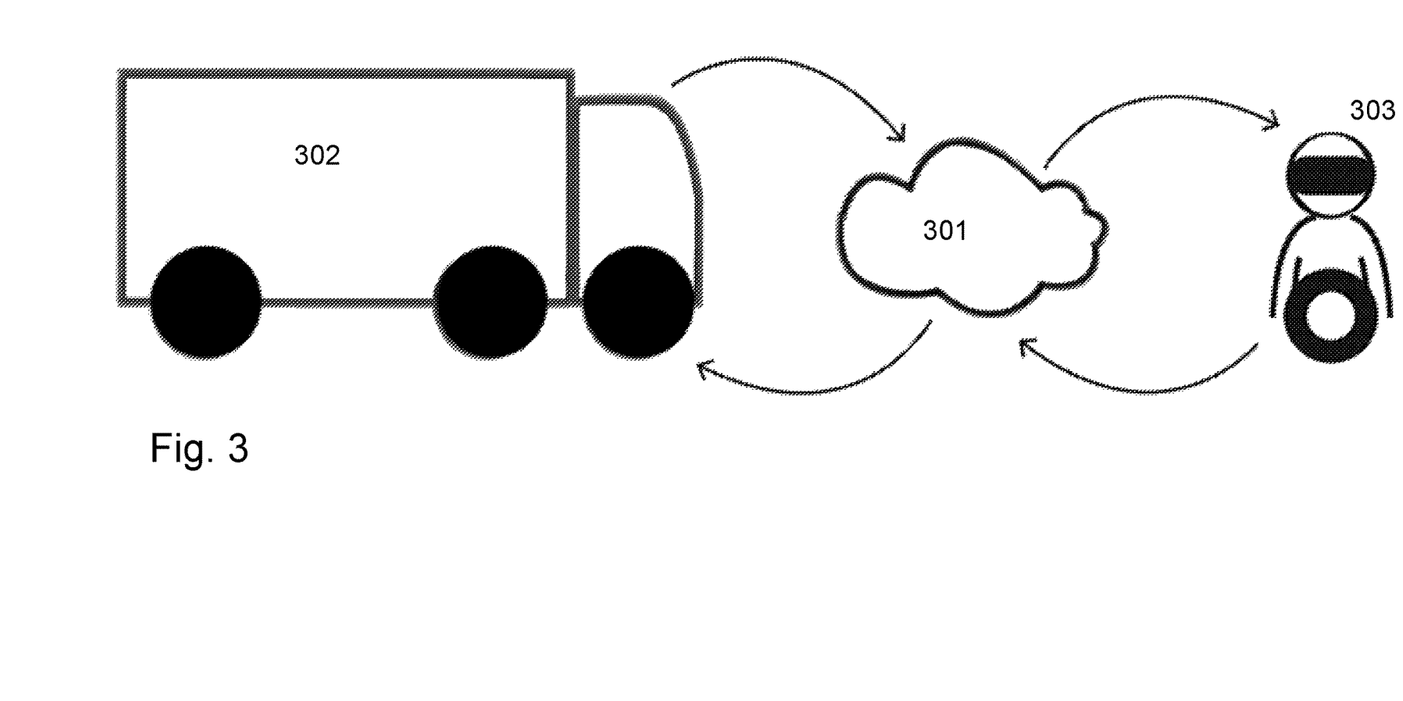
FIG. 3 is a schematic overview related to some embodiments herein.

FIG. 3 illustrates an overview of an exemplifying system related to the first scenario. The system comprises a cloud component 301, as an example of the network node 130. A truck 302, as an example of the wireless device 110, is remotely controlled by a driver 303, as an example of the controller node 120. The truck 302 may include one or more sensor modules (not shown). Additionally, it shall be understood that the driver 303 may be a real person or a computer that is set up to remotely control the truck 302.

Figure 4:
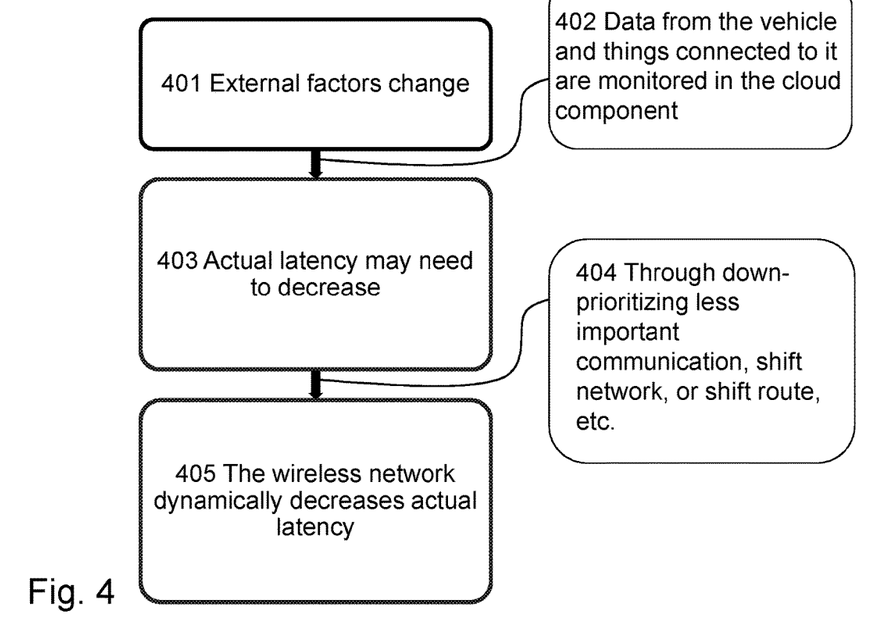
FIG. 4 is an exemplifying flowchart of an embodiment.
Figure 5:
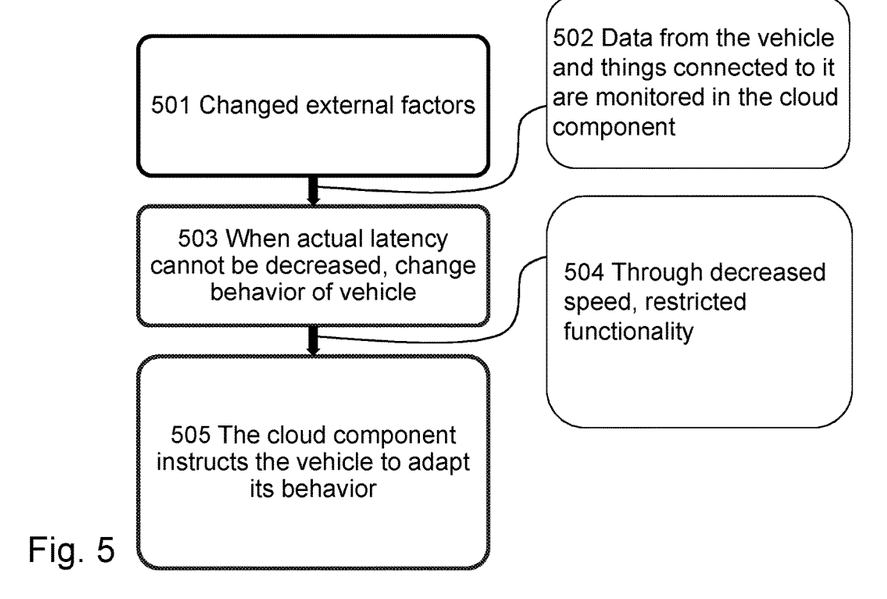
FIG. 5 is another exemplifying flowchart of another embodiment.

With reference to FIGS. 4 and 5, schematic flowcharts of exemplifying embodiments of the method performed by the network node 130 are shown.

The network node 130 is in this example exemplified by a cloud component, e.g. integrated with a so called 5G network. The cloud component applies a method for determining the actual latency and the required latency, based on readings from sensors comprised in a remotely controlled vehicle, which is taken as an example of the wireless device 110 and/or the controller node 120.

Taking the remotely controlled vehicle as an example, it would imply that the communication with the vehicle as well as the environment where the vehicle is located and the remote driver's location are monitored. Potential factors, given by the above mentioned at least one parameter relating to the context, from the environment of the vehicle have already been mentioned; weather conditions and traffic density are two examples, but also the status of the vehicle, such as the brakes.

Input from the driver's context, as an example of a parameter relating to the context of the controller node 120, can be how alert s/he is, measured by for example eye tracking or analysis of the driving behavior, also performed in the cloud component.

If the driver seems to be tired, his or her response time will be longer, and a lower required latency is one way of compensating for that. As the required latency is decreased, the actual latency in the connection with the remotely controlled vehicle may need to be adjusted accordingly.

As the remotely controlled vehicle is constantly in motion, the cloud component must continuously evaluate whether or not the required latency is fulfilled to allow for constant dynamical adjustments. It will not always be the case that it is possible to adjust the actual latency, and in those cases the behavior, i.e. the mode of operation, of the remotely controlled vehicle has to be adapted instead.

As an example, the remotely controlled vehicle is driven on a road and the actual latency suddenly increases so that there is an increased delay in the signal between the vehicle and the remote driver.

The cloud component detects that the actual latency is higher than a threshold, which is stored in the cloud, and what is defined in the SLA. As there might be no ways of affecting the actual latency in the wireless network at the moment, it will not be suitable for security reasons to continue driving the vehicle with the same speed as before. In that case the cloud component limits the possible maximal speed of the vehicle in accordance with the actual latency, to remain as safe as possible.

Given the changing external circumstances of the vehicle, i.e. given by the parameter relating to the context, the required latency varies constantly. The required latency is stored and managed in the cloud component. Hence, the embodiments herein propose a dynamic form of Service Level Agreement (SLA) that is relies on a condition. The condition is that an SLA comprises the highest tolerable required latency for different contexts, e.g. external condition, harsh weather that can impose that the required latency should be decreased, and that there is a SLA algorithm calculating the required latency based on a range of sensor data about current conditions. The network node is then able to adjust the required latency accordingly.

The cloud component compares and evaluates sensor data from the object's, in this example the vehicle's context to determine the required latency according to the SLA and the external factors, and whether the actual latency can be affected or if it is the connected object/process which has to adapt its mode of operation to the required latency.

As an example, the following actions, as shown in FIG. 4, may be performed when the actual latency of the wireless network can be changed.

Action 401

The cloud component may detect that external factors changes, e.g. the vehicle's speed decreases, that there is very little traffic in the surrounding of the vehicle. These changes place lower demands on the response time, i.e. a higher required latency may be accepted.

Action 402

The cloud component becomes aware of the new condition, e.g. in terms of the at least one parameter, and may need to decrease the required latency.

Action 403 and 404

The cloud component may find that the actual latency is higher than the required latency. Thus, the actual latency may need to be decreased by prioritization of the communication/data that is related to the wireless device 110 and/or the controller node 120, by selecting another route, another network etc.

Action 405

The wireless network dynamically decreases actual latency for the prioritized communication/data, referred to as transmissions above, between the vehicle and the remote driver.

As it is not always possible to affect the actual latency, and if again referring to remotely controlled or automated objects or processes, instead the object/process have to change behavior in order to cater for the increased latency without risking anything for a safety perspective. This can for example be a remotely controlled car that automatically limits its speed as the response time gets too high, control loops that normally are autonomous but instead have to be controlled by a human if the actual latency passes a certain threshold, automated robots in an industrial plant which have to work slower or under more supervision if the actual latency is detected to reach, or exceed, the threshold, as some examples.

Therefore, as an example, the following actions, as shown in FIG. 5, may be performed when the actual latency of the wireless network cannot be changed.

Action 501

Again, as in action 301, the cloud component may detect that external factors change, e.g. the vehicle's speed increases, that there is a lot of traffic in the surrounding of the vehicle. These changes place higher demands on the response time, i.e. a lower required latency may be needed.

Action 502

The cloud component becomes aware of the new condition and may need to decrease the required latency.

Action 503 and 504

In this case, it is not possible for the cloud component to instruct the wireless network to decrease the actual latency, e.g. due to network load. Hence, action 505 is performed.

Action 505

The cloud component limits the speed of the vehicle, and possibly applies additional augmented reality overlays in the drivers view to compensate for delays and further enhance safety.

As previously mentioned, the embodiments herein relate to so called 5G networks, which are more service/application aware and dynamic. Thus, when the network node 130 detects changed behavior of the controlled vehicle or its connected environment, which influences the required latency for the communication between the vehicle and its remote driver, it allows for adjustments accordingly.

Changed behavior can be speed of travelling, density of surrounding traffic, state of the carriage way, animals detected along the roadside, and so on. Awareness about this is attained from sensor data and other connected vehicles, etc. In the dynamic SLA there are threshold values for required latency depending on relative values of certain conditions, e.g. slippery road and high speed increases the need for low required latency a lot, especially if the traffic is dense too. Knowledge about threshold values and algorithms for determining a maximal required latency are processed in the cloud component. Then, there are several possibilities for how to achieve adjustment of the required latency.

The embodiments herein are not limited to the embodiments above, they can be applied to any connected wireless device, object or process for which latency has any relevance. For example, an industrial plant with an automated robot. If actual latency for any reason would reach, or exceed, a required latency with regard to the current conditions, the robot may, enforced by the cloud component, start operating with a slower speed, which decreases the sensitivity for somewhat higher latency.

Figure 6:
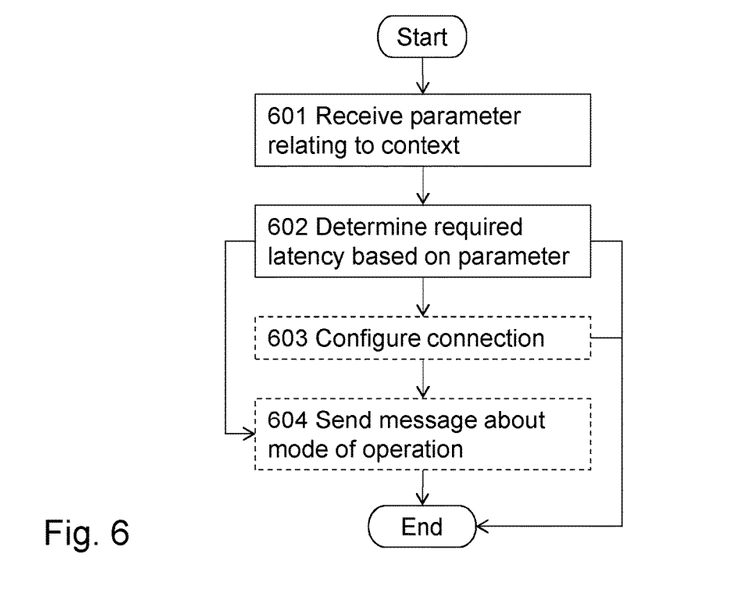
FIG. 6 is a flowchart illustrating embodiments of the method in the network node.

In FIG. 6, an exemplifying, schematic flowchart of embodiments of the method of the network node 130 as illustrated in FIG. 2 above is shown. As mentioned, the network node 130 performs a method for obtaining a required latency for transmissions between the wireless device 110 and the controller node 120. The controller node 120 is configured to control the wireless device 110.

The following actions may be performed in any suitable order.

Action 601

The network node 130 receives at least one parameter relating to a context of at least one of the wireless device 110 and the controller node 120. The at least one parameter relating to the context is detectable by a set of sensor modules 111, 121. The at least one parameter may be received from the at least of one the wireless device 110 and the controller node 120. This action is similar to action 202.

Action 602

The network node 130 determines, based on the at least one parameter, the required latency for the transmissions.

As mentioned, the context comprises one or more of: a surrounding of the at least one of the wireless device 110 and the controller node 120; an operational ability of the at least one of the wireless device 110 and the controller node 120; and a sensitivity of operation of the at least one of the wireless device 110 and the controller node 120.

The surrounding is measured in terms of a physical quantity detectable by at least one sensor module 111, 121 of the set of sensor modules 111, 121.

The operational ability relates to malfunction of one or more of the set of sensor modules 111, 121.

The sensitivity of operation indicates a scenario, detectable by at least one sensor module 111, 121 of the set of sensor modules 111, 121. The required latency ensures proper operation of the at least one of the wireless device 110 and the controller node 120 with respect to the scenario.

This action is similar to action 203.

Action 603

The network node 130 may configure, according to the required latency, a connection for transferring the transmissions between the wireless device 110 and the controller node 120. This action is similar to action 204.

Action 604

The network node 130 may send, to the wireless device 110, a message about a mode of operation adapted to the required latency. The message instructs the wireless device 110 to operate according to the mode of operation. This action is similar to action 205.

Figure 7:
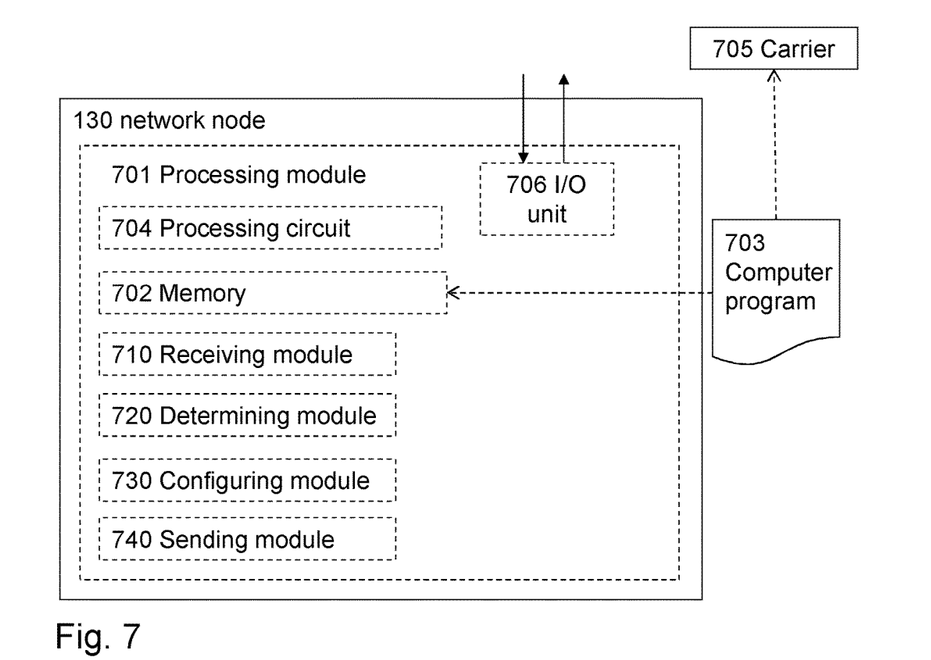
FIG. 7 is a block diagram illustrating embodiments of the network node.

With reference to FIG. 7, a schematic block diagram of embodiments of the network node 130 of FIG. 1 is shown. The network node 130 is configured to obtain a required latency for transmissions between a wireless device 110 and a controller node 120. The controller node 120 is further configured to control the wireless device 110.

The network node 130 may comprise a processing module 701, such as a means, one or more hardware modules and/or one or more software modules for performing the methods described herein.

The network node 130 may further comprise a memory 702. The memory may comprise, such as contain or store, a computer program 703.

According to some embodiments herein, the processing module 701 comprises, e.g. 'is embodied in the form of' or 'realized by', a processing circuit 704 as an exemplifying hardware module. In these embodiments, the memory 702 may comprise the computer program 703, comprising computer readable code units executable by the processing circuit 704, whereby the network node 130 is operative to perform the methods of FIG. 2 and/or FIG. 5.

In some other embodiments, the computer readable code units may cause the network node 130 to perform the method according to FIGS. 2 and/or 5 when the computer readable code units are executed by the network node 130.

FIG. 7 further illustrates a carrier 705, comprising the computer program 703 as described directly above. The carrier 705 may be one of an electronic signal, an optical signal, a radio signal, and a computer readable medium.

In some embodiments, the processing module 701 comprises an Input/Output unit 706, which may be exemplified by a receiving module and/or a sending module as described below when applicable.

In further embodiments, the network node 130 and/or the processing module 701 may comprise one or more of a receiving module 710, a determining module 720, a configuring module 730 and a sending module 740 as exemplifying hardware modules. In other examples, the aforementioned exemplifying hardware module may be implemented as one or more software modules.

Therefore, according to the various embodiments described above, the network node 130 is operative to and/or the network node 130, the processing module 701 and/or the receiving module 710 is configured to receive at least one parameter relating to a context of at least one of the wireless device 110 and the controller node 120. The at least one parameter relating to the context is detectable by a set of sensor modules 111, 121.

Furthermore, the network node 130 is operative to and/or the network node 130, the processing module 701 and/or the determining module 720 is configured to determine, based on the at least one parameter, the required latency for the transmissions.

As mentioned, the context comprises one or more of: a surrounding of the at least one of the wireless device 110 and the controller node 120; an operational ability of the at least one of the wireless device 110 and the controller node 120; and a sensitivity of operation of the at least one of the wireless device 110 and the controller node 120. The surrounding is measured in terms of a physical quantity detectable by at least one sensor module 111, 121 of the set of sensor modules 111, 121.

The operational ability relates to malfunction of one or more of the set of sensor modules 111, 121.

The sensitivity of operation indicates a scenario, detectable by at least one sensor module 111, 121 of the set of sensor modules 111, 121. The required latency ensures proper operation of the at least one of the wireless device 110 and the controller node 120 with respect to the scenario.

The network node 130 may be operative to and/or the network node 130, the processing module 701 and/or the configuring module 730 may be configured to configure, according to the required latency, a connection for transferring the transmissions between the wireless device 110 and the controller node 120.

Moreover, the network node 130 may be operative to and/or the network node 130, the processing module 701 and/or the sending module 740 may be configured to send, to the wireless device 110, a message about a mode of operation adapted to the required latency. The message instructs the wireless device 110 to operate according to the mode of operation.

As used herein, the term "processing module" may in some examples refer to the processing circuit, such as a processing unit, a processor, an Application Specific integrated Circuit (ASIC), a Field-Programmable Gate Array (FPGA) or the like. The processing circuit or the like may comprise one or more processor kernels. In these examples, the processing module is thus embodiment by a hardware module. In other examples, the processing module may be embodied by a software module. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a BLU-RAY disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a network node, for obtaining a required latency for transmissions between a wireless device and a controller node, wherein the controller node is configured to control the wireless device, wherein the method comprises:
    receiving at least one parameter relating to a context of at least one of the wireless device and the controller node, wherein the at least one parameter relating to the context is detectable by a set of sensor modules; and
    determining, based on the at least one parameter, the required latency for the transmissions, wherein the context comprises one or more of:
        a surrounding of the at least one of the wireless device and the controller node, wherein the surrounding is measured in terms of a physical quantity detectable by at least one sensor module of the set of sensor modules;
        an operational ability of the at least one of the wireless device and the controller node, wherein the operational ability relates to malfunction of one or more of the set of sensor modules; and
        a sensitivity of operation of the at least one of the wireless device and the controller node, wherein the sensitivity of operation indicates a scenario, detectable by at least one sensor module of the set of sensor modules, wherein the required latency ensures proper operation of the at least one of the wireless device and the controller node with respect to the scenario; and
    sending, to the wireless device, a message about a mode of operation adapted to the required latency, wherein the message instructs the wireless device to operate according to the mode of operation.

2. The method according to claim 1, wherein the at least one parameter is received from the at least of one the wireless device and the controller node.

3. The method according to claim 1, wherein the method comprises:
    configuring, according to the required latency, a connection for transferring the transmissions between the wireless device and the controller node.

4. A network node configured to obtain a required latency for transmissions between a wireless device and a controller node, wherein the controller node is configured to control the wireless device, wherein the network node comprises a processing circuit that is configured to:
    receive at least one parameter relating to a context of at least one of the wireless device and the controller node, wherein the at least one parameter relating to the context is detectable by a set of sensor modules; and
    determine, based on the at least one parameter, the required latency for the transmissions, wherein the context comprises one or more of:
        a surrounding of the at least one of the wireless device and the controller node, wherein the surrounding is measured in terms of a physical quantity detectable by at least one sensor module of the set of sensor modules;
        an operational ability of the at least one of the wireless device and the controller node, wherein the operational ability relates to malfunction of one or more of the set of sensor modules; and
        a sensitivity of operation of the at least one of the wireless device and the controller node, wherein the sensitivity of operation indicates a scenario, detectable by at least one sensor module of the set of sensor modules, wherein the required latency ensures proper operation of the at least one of the wireless device and the controller node with respect to the scenario, and
    send, to the wireless device, a message about a mode of operation adapted to the required latency, wherein the message instructs the wireless device to operate according to the mode of operation.

5. The network node according to claim 4, wherein the processing circuit of the network node is further configured to receive the at least one parameter from the at least one of the wireless device and the controller node.

6. The network node according to claim 4, wherein the processing circuit of the network node is further configured to configure, according to the required latency, a connection for transferring the transmissions between the wireless device and the controller node.

7. A computer program product comprising a non-transitory computer readable storage medium storing program code which when executed on a processor of the network node causes the network node to perform the method according to claim 1.

8. A method, performed by a network node, for obtaining a required latency for transmissions between a wireless device and a controller node, wherein the controller node is configured to control the wireless device, wherein the method comprises:
    receiving at least one parameter relating to a context of at least one of the wireless device and the controller node, wherein the at least one parameter relating to the context is detectable by a set of sensor modules; and
    determining, based on the at least one parameter, the required latency for the transmissions, wherein the context comprises:
        1) an operational ability of the at least one of the wireless device and the controller node, wherein the operational ability relates to malfunction of one or more of the set of sensor modules; or 2) a sensitivity of operation of the at least one of the wireless device and the controller node, wherein the sensitivity of operation indicates a scenario, detectable by at least one sensor module of the set of sensor modules, wherein the required latency ensures proper operation of the at least one of the wireless device and the controller node with respect to the scenario; and sending, to the wireless device, a message about a mode of operation adapted to the required latency, wherein the message instructs the wireless device to operate according to the mode of operation.

9. The method of claim 8, further comprising, based on the required latency configuring a connection used to transfer the transmissions between the wireless device and the controller node.

\* \* \* \* \*